May 3, 1927.

E. E. NOBLE 1,626,957

OIL PACKING FOR INCLOSED AXLES OR SHAFTS

Filed March 8, 1922

Inventor:
Ernest E. Noble.
By H. G. Fletcher
atty.

Patented May 3, 1927.

1,626,957

UNITED STATES PATENT OFFICE.

ERNEST E. NOBLE, OF YALE CITY, OKLAHOMA.

OIL PACKING FOR INCLOSED AXLES OR SHAFTS.

Application filed March 8, 1922. Serial No. 541,959.

The primary object of this invention is to provide an improved packing device for the rear axle and housing of a vehicle for preventing the escape of oil from the housing.

Another object of the invention is to provide an improved packing device for an inclosed turnable shaft or the like.

Other and further objects will appear in the specification and be specifically pointed out in the appended claims, reference being had to the accompanying drawings exemplifying the invention, and in which:—

Figure 1:
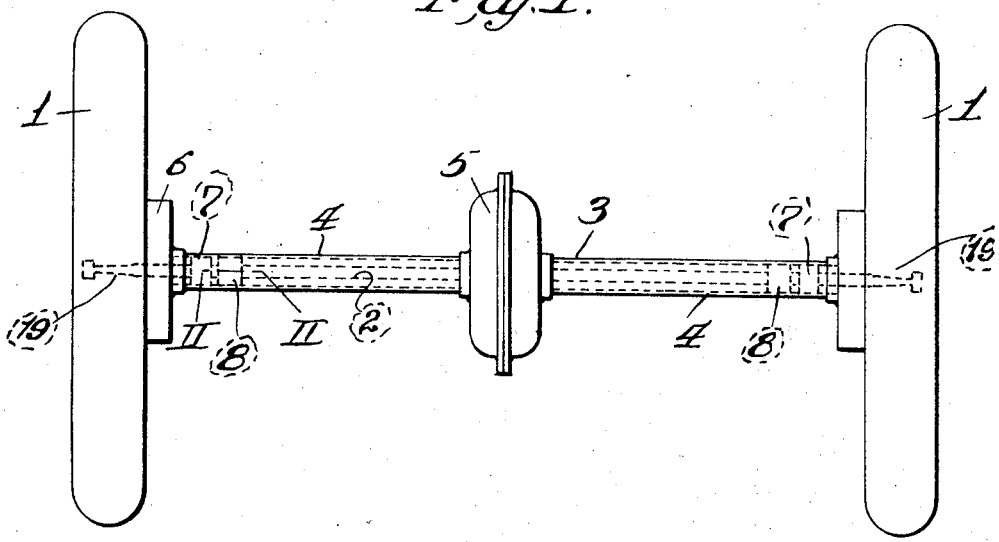
Figure 1 is a rear elevation of the rear axle and differential housing of an automobile to which this improved packing device is applicable.
Figure 2:
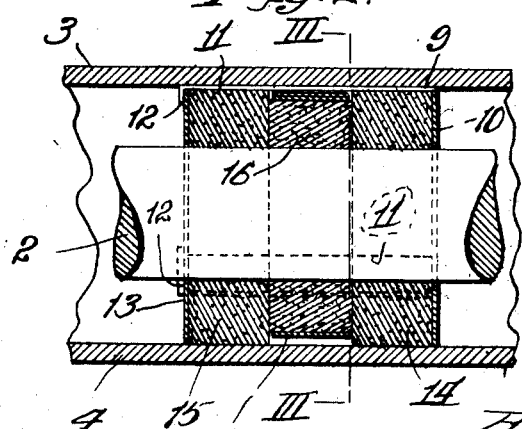
Figure 2 is an enlarged fragmentary horizontal section taken on the line II—II of Fig. 1.
Figure 3:
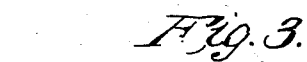
Figure 3 is an enlarged transverse vertical section taken on the line III—III of Fig. 2.
Figure 3:
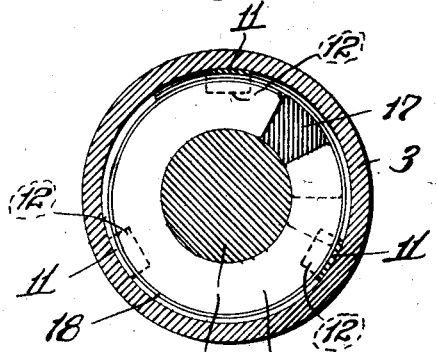
Figure 4:
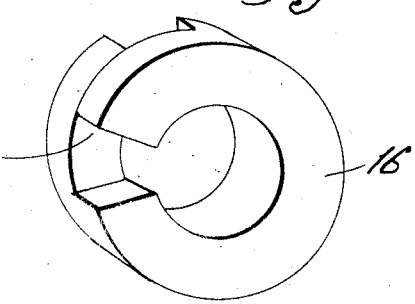
Figure 4 is an enlarged perspective view of the centrally arranged packing ring used in conjunction with this improved device.

In the operation of automobiles and the like, especially in warm weather it has been found that the lubricant provided in the differential housing, for the gearing therein will work thin and be carried to the opposing parts of the axle housing, and will eventually work out of the axle housing adjacent the traction wheels of the vehicle. This improved invention, therefore, is to prevent the escape of oil from the axle housing.

With reference to the accompanying drawings 1 designates the traction wheels of a vehicle which are supported from the rear axle 2, and for incasing said axle in the housing 3 which is provided with the usual branches 4 which extend from the differential housing 5 which contains the differential gearing not shown.

The housing is provided with the usual brake drums 6 at the extending end of each of the housing branches 4 and located in each branch 4 adjacent its respective brake drum is a bearing 7, said bearings being for the support of the axle 2, and located within each housing branch 4 inwardly of a respective bearing 7 is this improved oil packing 8.

This improved oil packing is comprised of a retaining cage 9 having an integral end 10 and longitudinally extending side members 11, each of said members at its extending end being bent inwardly as designated at 12, said inwardly bent portions being for the support of a metallic washer 13.

Located within the cage 9 adjacent the end 10 is a felt washer 14 and engaging the metallic washer 13 is a felt washer 15, and mounted intermediate of said washers 14 and 15 and in abutting relation thereto is another felt washer 16 which is provided with a lapped split as designated at 17.

Mounted over the outer periphery of the washer 16 is a flat coil spring 18 which is the approximate width of said washer 16, said spring being overlapped and tending to contract against the outer periphery of said washer 16.

In assembling this improved packing, the side members 11 are outwardly sprung and the washer 14 is mounted interiorly of the members 11 and seated against the end 10 of the cage 9. The lapped split washer 16 bearing the spring 18 is then mounted in abutting relation to the washer 10. The washer 15 is then mounted against the washer 16, and the metallic washer 13 is mounted thereagainst, and the bent portion 12 of each member 11 is permitted to engage against the washer 13. This assembly permits this improved packing element to be handled and mounted as a unit.

In mounting this improved oil packing in place on the axle 2 within the axle housing 3, the wheels of the vehicle are removed and each bearing 7 is withdrawn.

After the withdrawal of each bearing 7 each oil packing 8 which is retained in a respective cage 9 is mounted over a respective spindle end 19 of the shaft 2 and forced into a position beyond that occupied by a respective bearing 7.

Each bearing 7 is then replaced and the wheels 1 remounted on the axle 2.

In the operation of the rear axle after the improved oil packings 8 have been mounted thereon, the oil from the differential housing 5, upon entering and traversing the housing branches 4 will be prevented by the improved oil packings 8 from escaping from the housing branches 4 adjacent the brake drums 6. In this connection the oil upon reaching each respective oil packing will be prevented from traveling further along the shaft by the centrally arranged washer 16, as each of said washers are held tightly against the shaft by its respective contracting spring 18, the wear of each washer being compensated for by the lapped split 17 thereof allowing for the circumferential reducing of each washer 16.

On account of the washers 14 and 15 of each packing 8 being resilient and made of felt, the outer periphery of said washers will engage against the inner wall of the branches 4 of the housing 3, thereby preventing each packing 8 from being turned by the shaft 2, and on account of the abutting engagement of each pair of washers 14 and 15 with the lapped split washer 16. said washer 16 will also be prevented from being turned with the shaft.

What I claim is:—

1. The combination of a housing, a shaft located in said housing, a lapped split pliant band mounted on said shaft, compressing means encircling said band, a washer located on each side of said band in frictional engagement therewith, and with the inner periphery of said housing for preventing said band from being turned by said shaft, and a retaining cage for supporting said band and said washers in abutting relation having apertures so that portions of said washers can engage said housing.

2. The combination of an axle housing, an axle supported in said housing, a plurality of packing elements mounted over said axle, a retaining cage mounted over said elements having end portions for engagement with said elements, said cage providing means for mounting or dismounting said elements together relative to said axle, said cage being provided with apertures so that portions of one of said elements can engage the interior wall of said housing.

ERNEST E. NOBLE.